United States Patent

Colombo et al.

[11] Patent Number: 5,915,772
[45] Date of Patent: Jun. 29, 1999

[54] ROTARY ELECTROMAGNETIC HEAD WITH IMPROVED MECHANICAL EXPULSION DEVICE FOR AUTOMATIC STACKERS OF IRON SECTIONS ORIGINATING FROM A ROLLING MILL

[75] Inventors: Ezio Colombo; Marco Rossini, both of Varese, Italy

[73] Assignee: Techint Compagnia Tecnica Internazionale S.p.A., Milan, Italy

[21] Appl. No.: 08/948,940

[22] Filed: Oct. 10, 1997

[30] Foreign Application Priority Data

Oct. 11, 1996 [IT] Italy .................. MI96A2102

[51] Int. Cl.[6] .............................. B65G 57/04; B66C 1/04
[52] U.S. Cl. .................. 294/65.5; 414/737; 414/793.2
[58] Field of Search ......................... 294/65.5; 414/606, 414/737, 758, 788.3, 791.4, 793.2; 335/291–295

[56] References Cited

U.S. PATENT DOCUMENTS 3,856,157  12/1974  Hill ........................................ 294/65.5

FOREIGN PATENT DOCUMENTS

| 0 099 863 | 2/1984 | European Pat. Off. . | |
|---|---|---|---|
| 0 196 685 | 10/1986 | European Pat. Off. . | |
| 0 318 722 | 6/1989 | European Pat. Off. . | |
| 2935-475 | 3/1981 | Germany | 294/65.5 |
| 1289-793 | 2/1987 | U.S.S.R. | 294/65.5 |
| 1504-196 | 8/1989 | U.S.S.R. | 294/65.5 |
| 1583-344 | 8/1990 | U.S.S.R. | 29/65.5 |
| 792-793 | 7/1991 | U.S.S.R. | 294/65.5 |

*Primary Examiner*—Dean Kramer
*Attorney, Agent, or Firm*—Oblon, Spivak, McClelland, Maier & Neustadt, P.C.

[57] ABSTRACT

A rotary electromagnetic head for automatic stackers of iron sections originating from a rolling mill. And an expulsion device is provided with a bar rotating together with the head but also provided with simultaneous movement relative to the head. This relative movement is caused by a cam against the action of a counteracting spring.

2 Claims, 10 Drawing Sheets

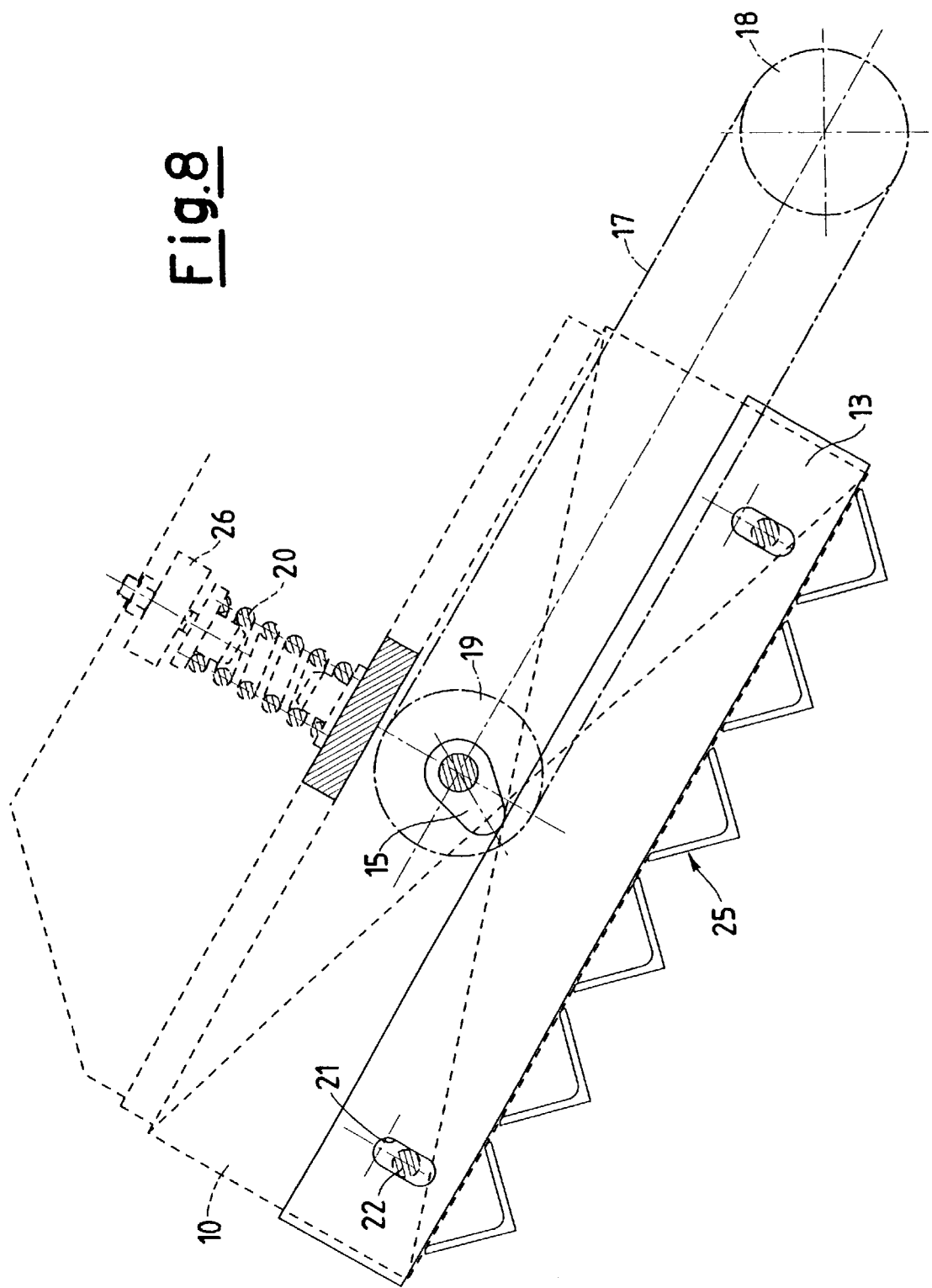

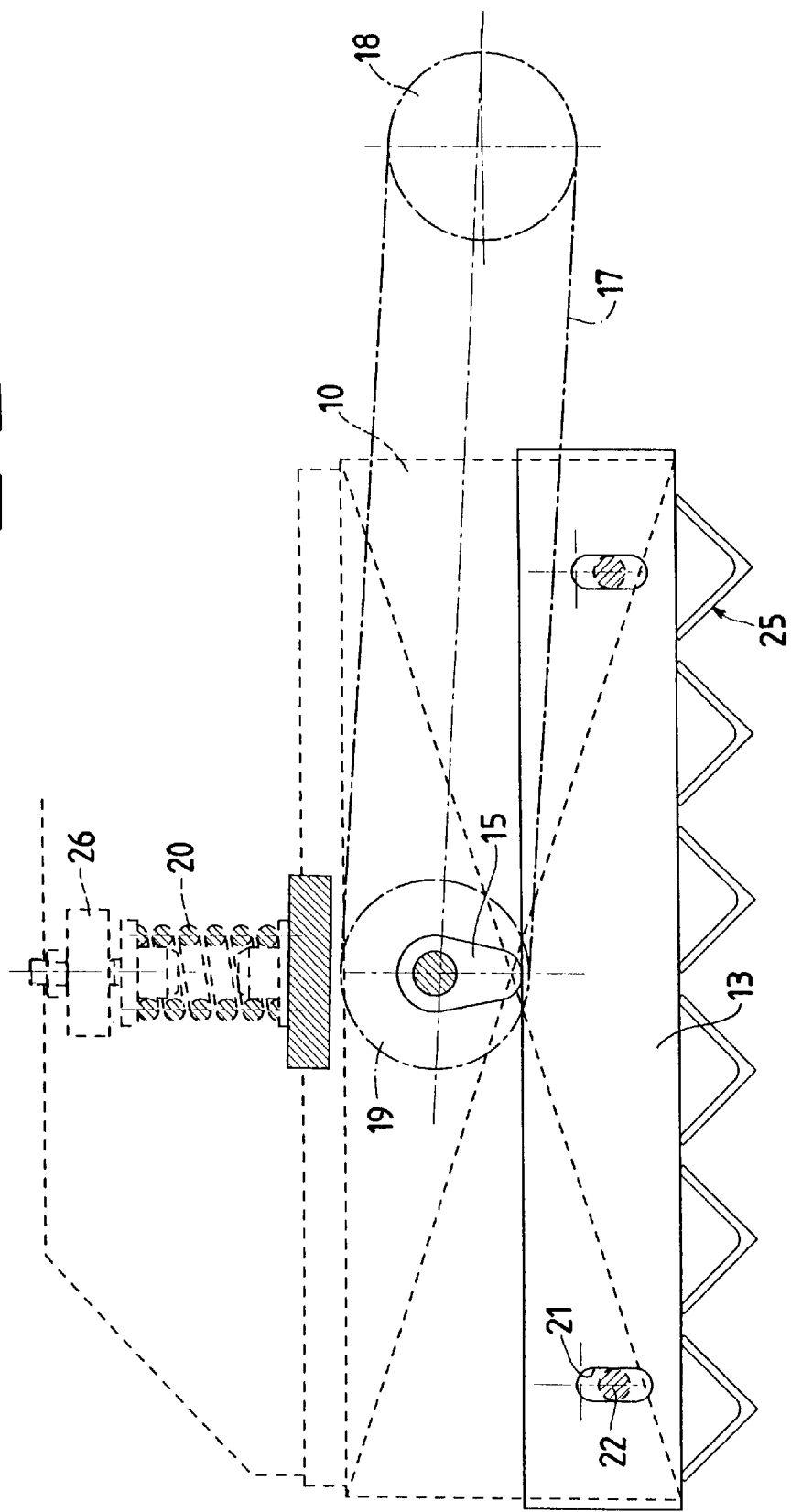

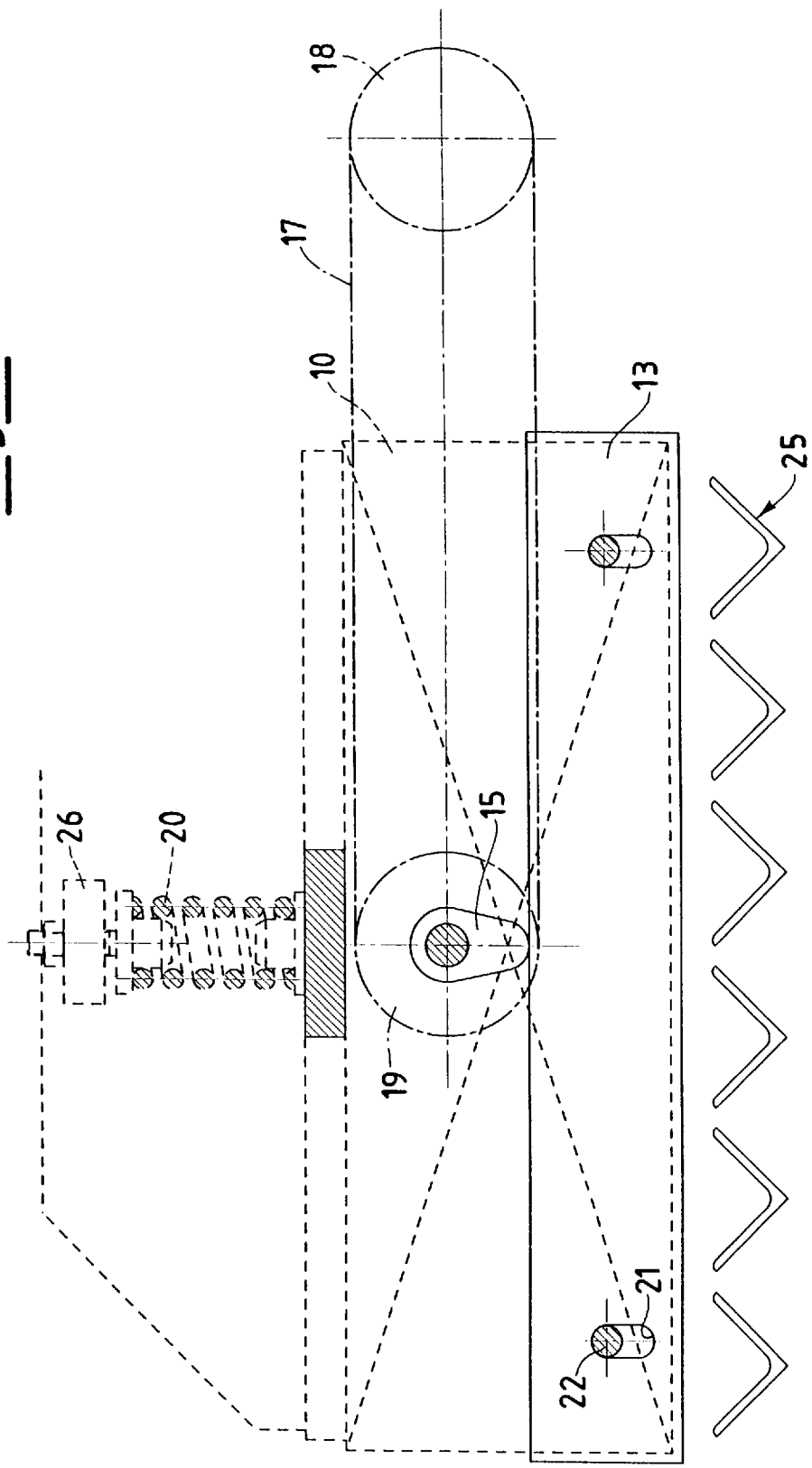

ROTARY ELECTROMAGNETIC HEAD WITH IMPROVED MECHANICAL EXPULSION DEVICE FOR AUTOMATIC STACKERS OF IRON SECTIONS ORIGINATING FROM A ROLLING MILL

This invention relates to a rotary electromagnetic head provided with a mechanical expulsion device, for application to automatic stackers for rolled iron sections cut to commercial length. Automatic stackers for iron sections originating from a rolling mill are well known to the expert of the art, for example from EP 0099863, EP 0196685 and EP 0318722.

In these stackers the rotary electromagnetic heads withdraw an ordered layer of sections from a transport system and position it inverted on a layer of sections previously deposited in an upright position on a descender provided in a formation region for the stack to be packaged.

Generally, the rotary heads cooperate with to and fro traversing carriages provided with lances able to withdraw from said transport system, alternately with the heads, those section layers to be deposited on the descender in an upright position. In these stackers of known type, the heads are rotated by linkages able to cause the heads to move forward to a certain distance from the top of the last section layer deposited on the descender, from which distance the section layer is allowed to fall by demagnetizing the heads and with the aid of a mechanical expulsion device.

Currently expulsion devices are used which, by means of separate drives (for example pneumatic or hydraulic), are inserted and activated when the electromagnetic head has reached its final position for discharging the rolled product.

Known expulsion devices are of two types, namely a first type mounted directly on the rotary head and a second type applied in a fixed position, close to the rotary head.

The first type, with its drive (normally a pneumatic cylinder) applied to a movable part (the electromagnetic head), requires feed hoses which, because of the ever increasing production rate required, are subject to breakage which limits the reliability of this type of expulsion device with time.

To obviate this drawback, fixed expulsion devices separate from the electromagnetic head have been used, acting by means of mechanical arms on the sections carried by the electromagnetic head, to detach the sections.

However in this latter case the time required for positioning the expulsion arms reduces the system productivity.

The object of the present invention is therefore to provide an expulsion device able to satisfy the reliability and productivity requirements of modern plants.

Said object is attained by an expulsion device with the characteristics defined in the accompanying claims.

The structural and operational characteristics of the invention and its advantages over the known art will be more apparent from an examination of the following description given with reference to the accompanying drawings, which show one embodiment of the invention. On the drawings:

FIGS. 6 to 10 are example diagrams showing in greater detail and in sequence the operating stages of the head according to the invention shown in FIGS. 1 to 5.

Figure 1:
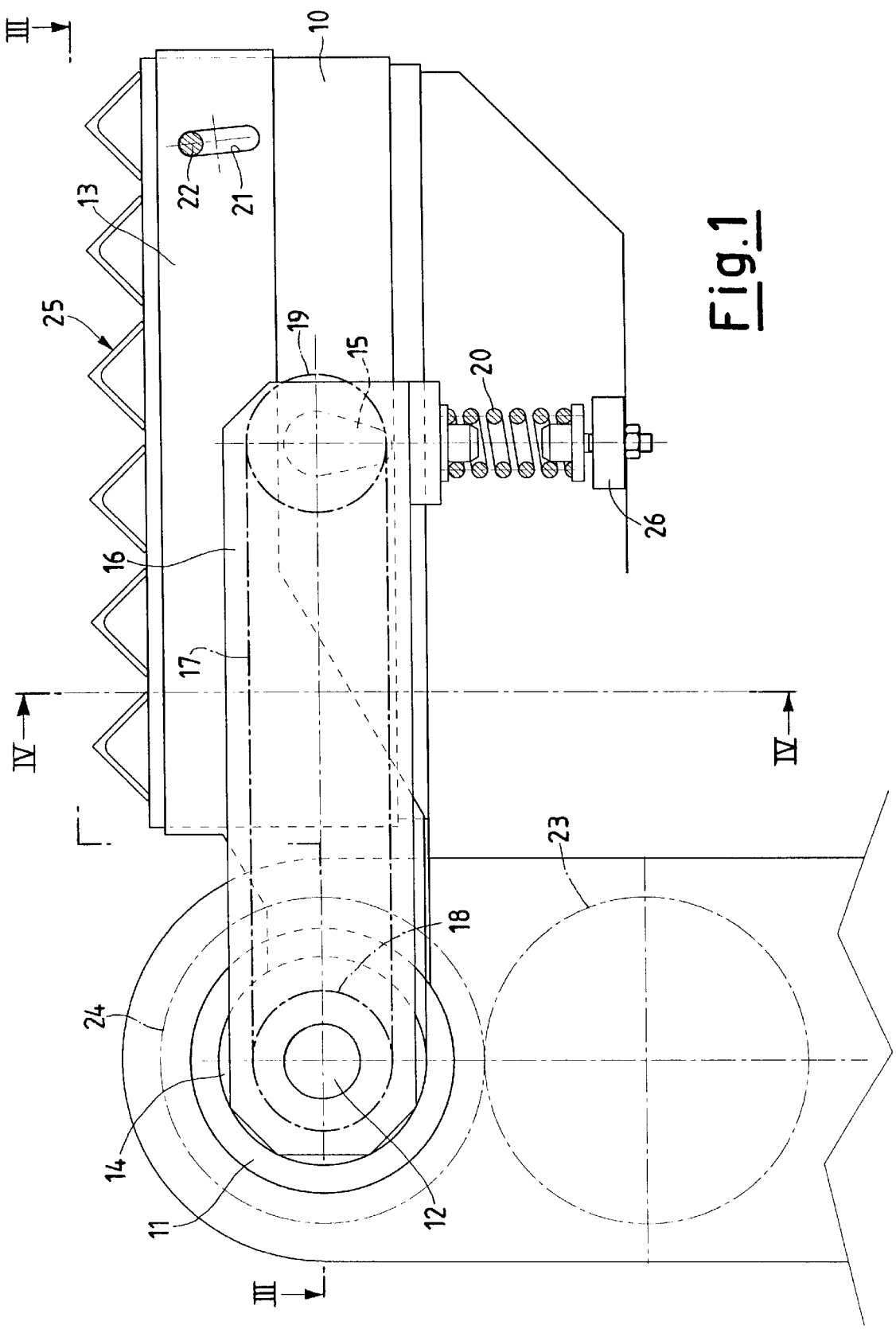
FIG. 1 is a side elevation showing a magnetic head according to the invention in the position for receiving a group of sections originating from a rolling mill.

On the drawings the reference numeral 10 indicates an electromagnetic head extending radially from a hub 11 rigid with a shaft 12.

On said shaft 12 there is mounted the section expulsion device consisting of a bar 13 idly mounted on the shaft 12 via a hub 14. With said bar 13 there cooperates a cam 15 extending laterally from a pair of arms 16 idly mounted on the shaft 12. The cam 15 is rotated, together with the head 10, by a drive chain 17 extending between a sprocket wheel 18 rigid with the shaft 12 and a sprocket wheel 19 provided at the free end of the pair of arms 16.

A counteracting spring 20 acts between the head 10 and the free end of the pair of arms 16, in correspondence with the cam 15. As will be explained hereinafter, the bar 13 is driven relative to the head 10 with rotary movement guided and limited by a slot 21 provided in the bar 13 and engaging the pin 22 extending from the head 10.

The shaft 12 can be rotated for example by a motorized gearwheel 23 engaging a driven gearwheel 24 rigid with the shaft 12. The operation of the device according to the invention is clear from the aforegoing description given with reference to the figures, and is briefly as follows.

Figure 4:
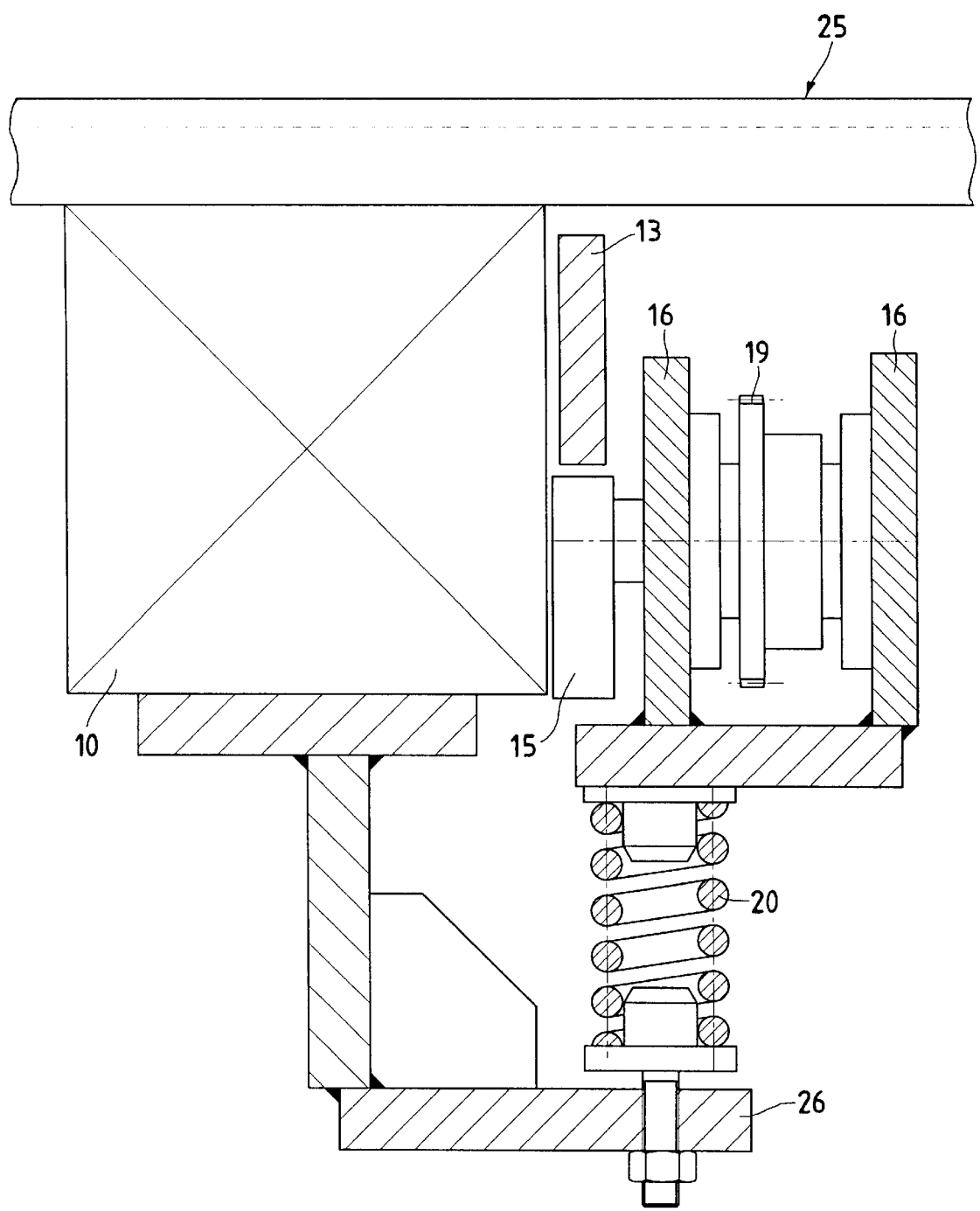
FIG. 4 is an enlarged section taken on the plane IV—IV of FIG. 1.
Figure 6:
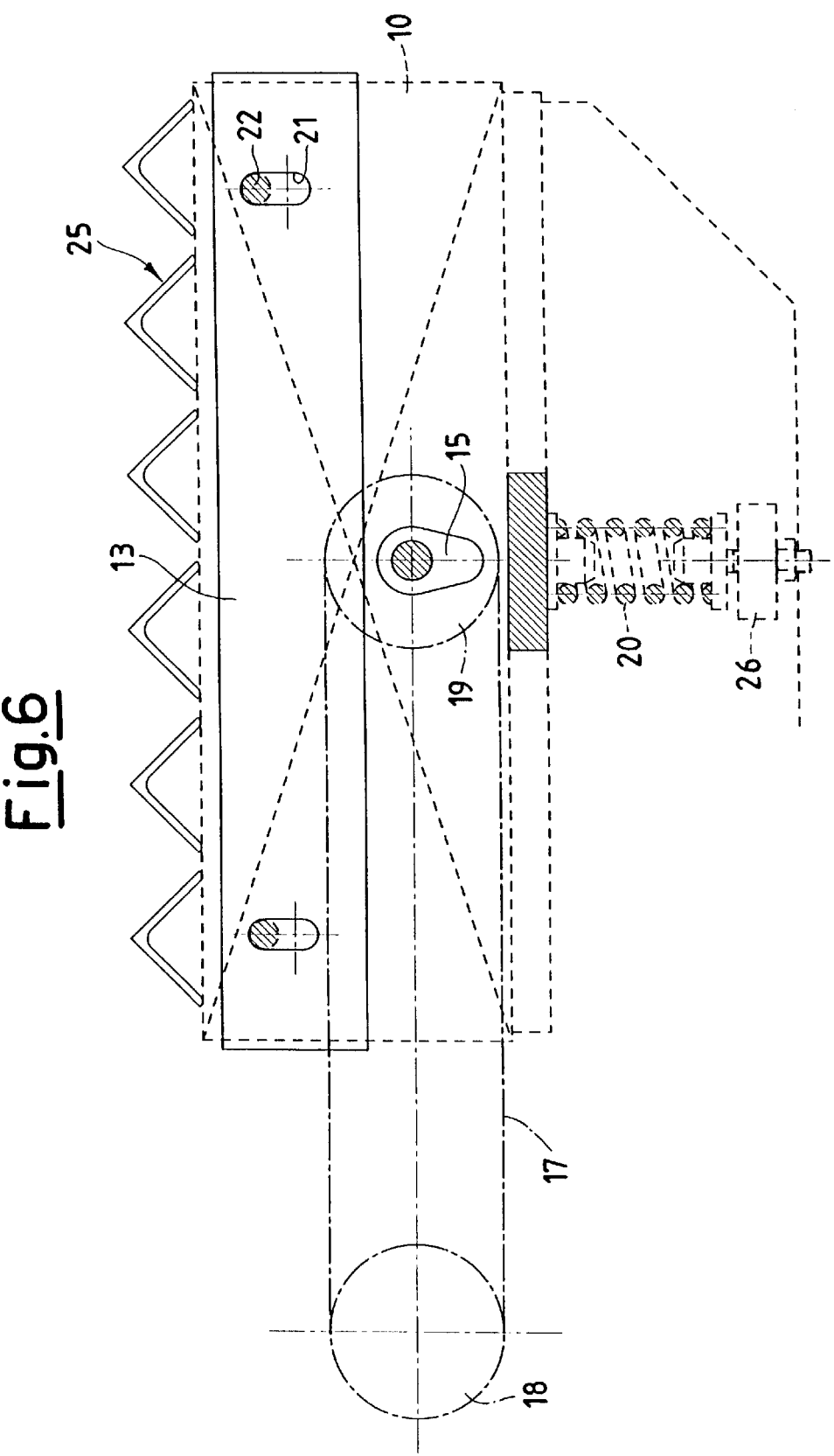
Figure 7:
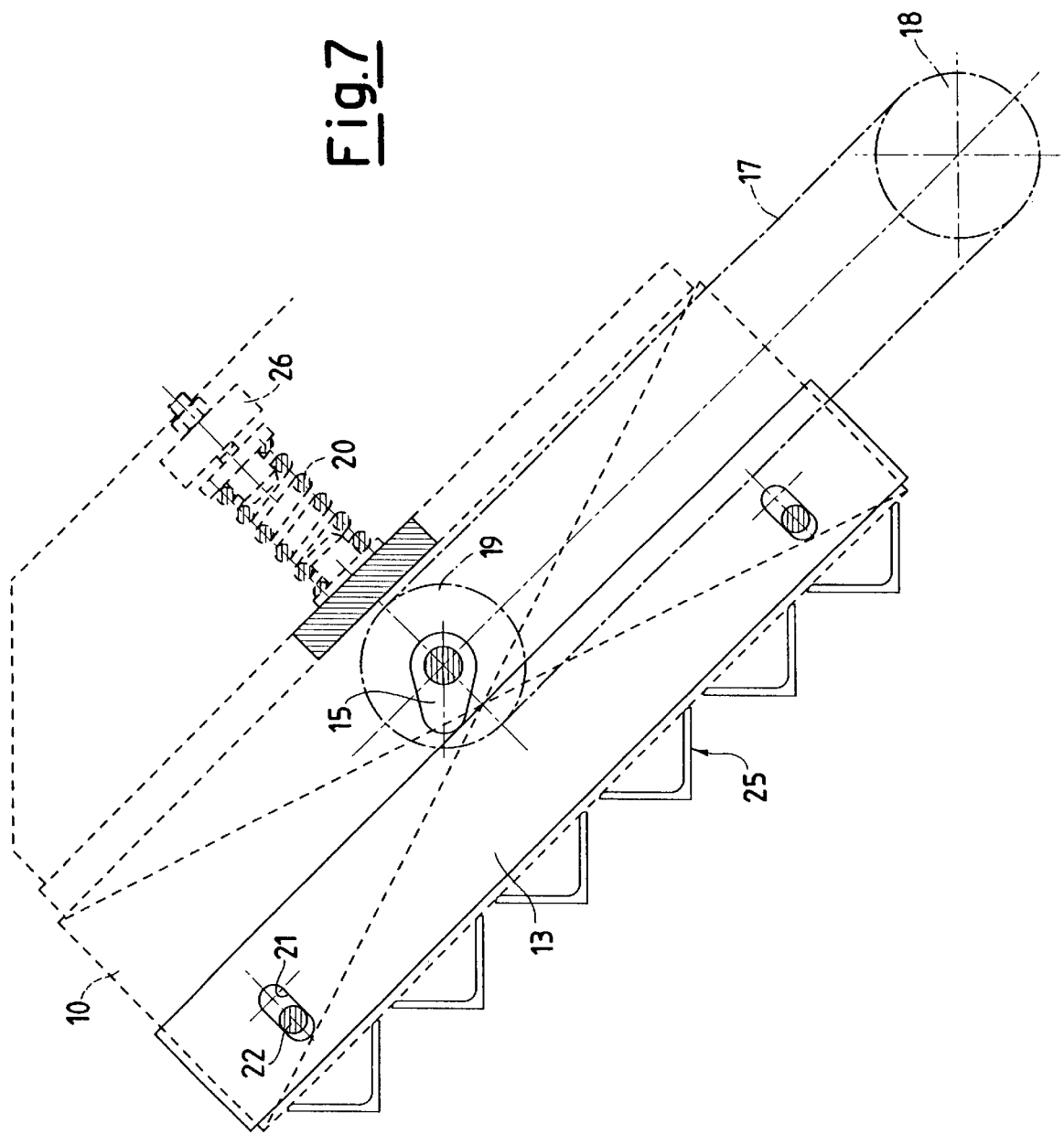

An ordered layer of sections 25 is deposited on the electromagnetic head 10 in the position shown in FIGS. 1, 4 and 6, in known manner, for example as described and illustrated in patent application MI96A 001422 filed on Jul. 10, 1996 in the name of the present applicant.

Figure 2:
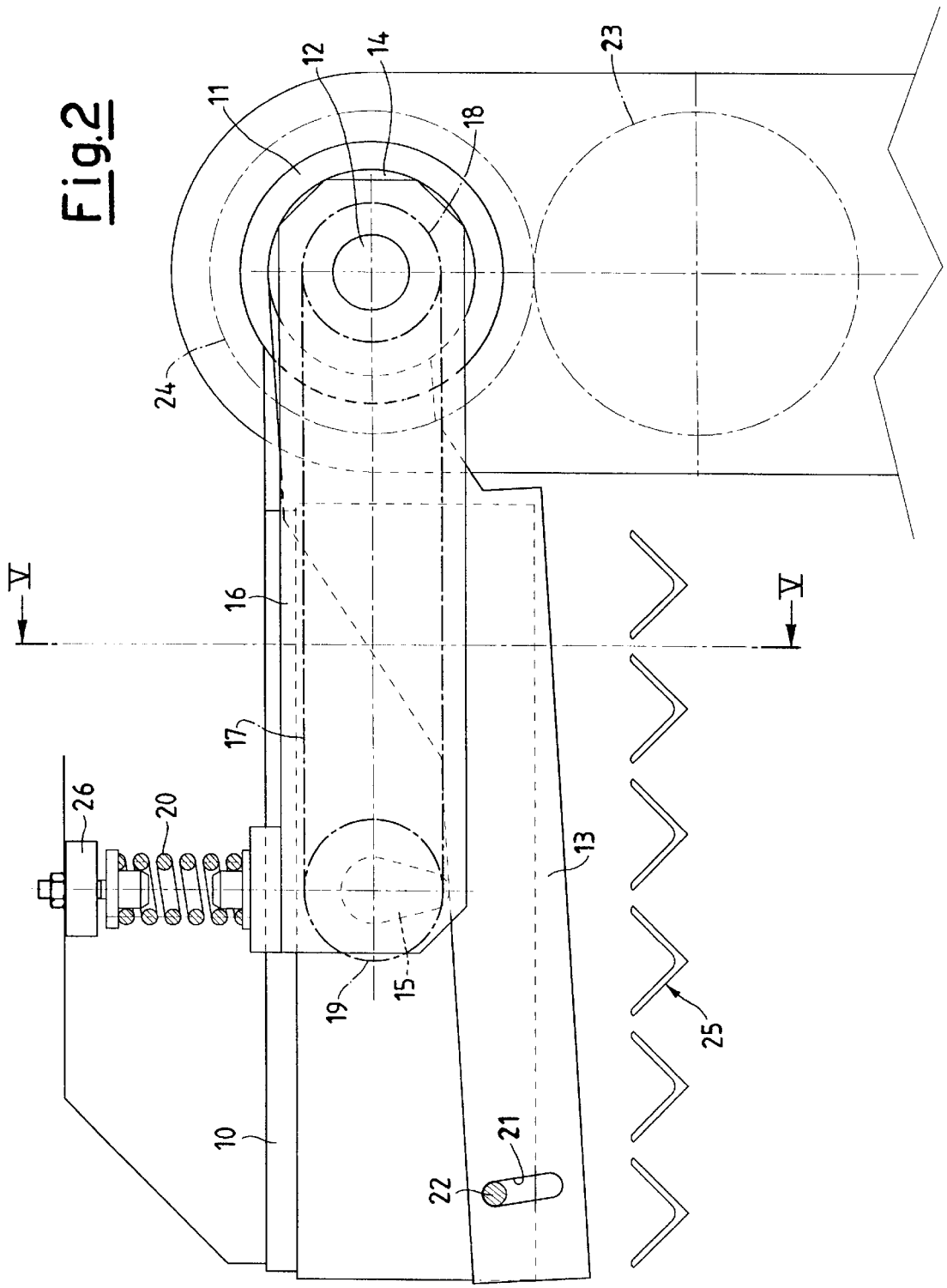
FIG. 2 is a view showing the head of FIG. 1 in the 180° rotated position for detaching the group of sections from it.
Figure 3:
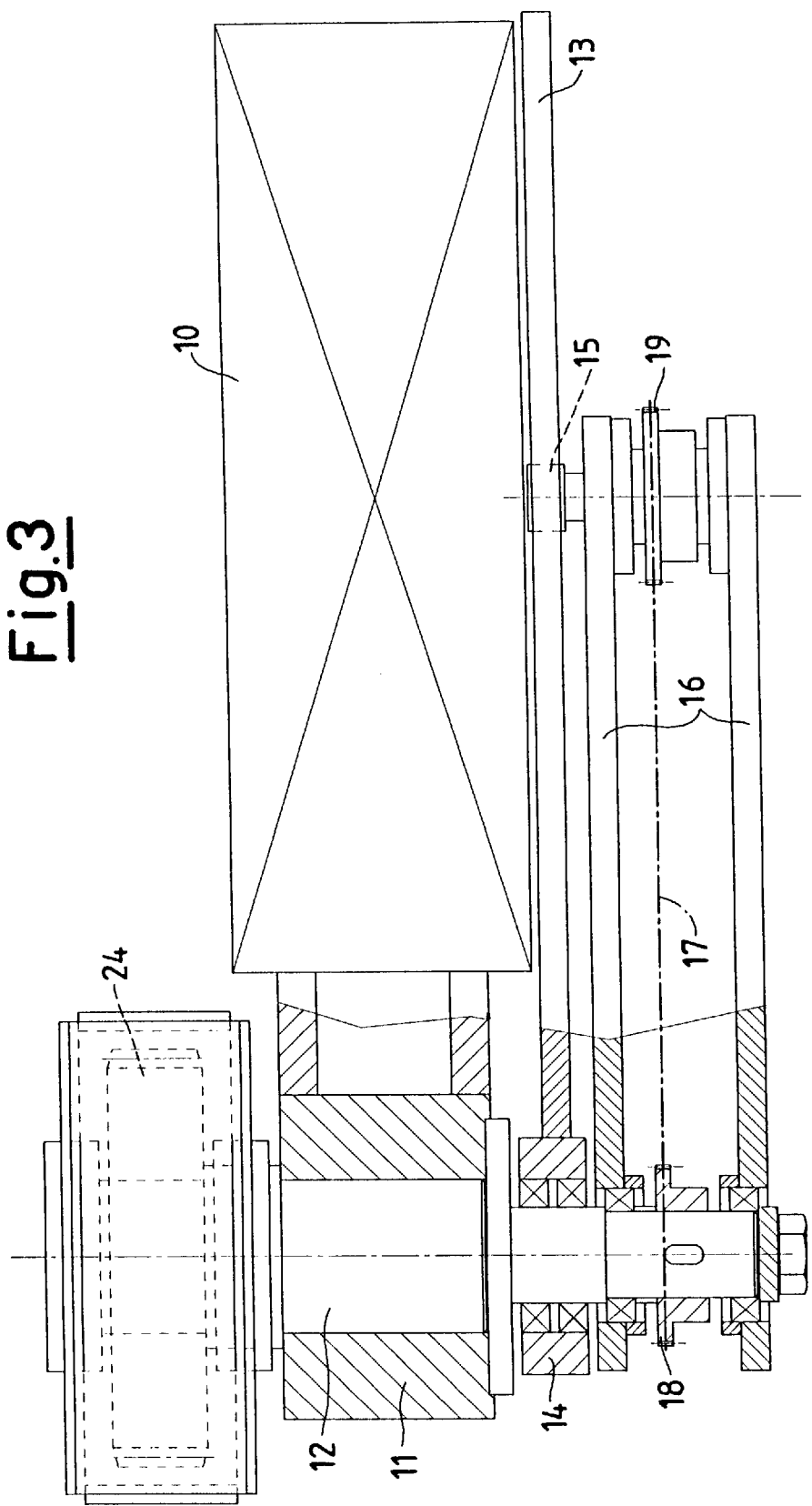
FIG. 3 is a partly sectional plan view on the plane III—III of FIG. 1.
Figure 5:
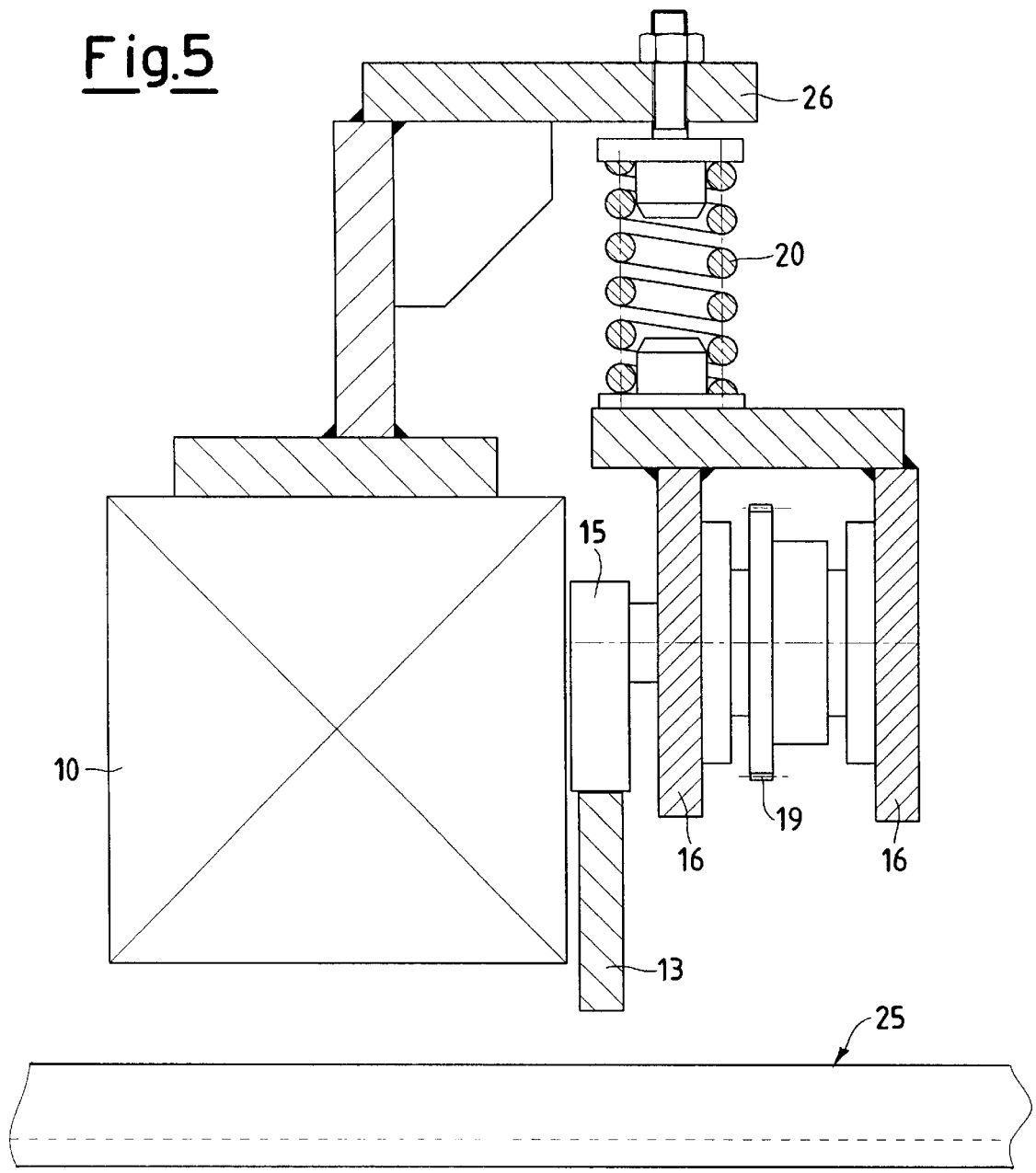
FIG. 5 is an enlarged section taken on the plane V—V of FIG. 2.

The electromagnetic head 10 is rotated through about 180° by the driven gearwheel 24, as shown in the sequence illustrated in FIGS. 6–10 and, by virtue of the action of the cam 15 on the expulsion bar 13 (action counteracted by the rear stop 26 of the spring 20 rigid with the electromagnetic head 10 and by the magnetized sections 25), preloads the spring 20. As a result, as shown in FIGS. 2, 5 and 10, the expulsion bar 13 detaches the layer of sections 25 from the electromagnetic head 10, simultaneously with its demagnetization.

By rotating in the reverse direction, the electromagnetic head 10 is then returned to its rest position of FIGS. 1, 4 and 6 ready to receive a further layer 25 of sections. During this rotation the action of the cam 15 also ensures that the expulsion bar 13 becomes repositioned by gravity.

The object stated in the introduction to the description is therefore attained, ie of providing an extremely reliable expulsion device able to satisfy current productivity requirements of modern plants in which, without additional drives but by being connected to the rotary drive for the electromagnetic head, the result is achieved of automatically causing system deactivation during product withdrawal, its preloading during rotation, and then its activation, implemented by the demagnetization of the electromagnetic head.

We claim:

1. A rotary electromagnetic head with a mechanical expulsion device for automatic stackers of iron sections from a rolling mill, comprising:

a shaft on which said rotary electromagnetic head is fixed;

a bar which is idly mounted on said shaft and which rotates together with said rotary electromagnetic head;

a pair of arms idly mounted on said shaft which rotate together with the head;

a cam extending laterally from said pair of arms;

a drive chain extending between a first sprocket wheel which is rigid with said shaft and a second sprocket wheel provided at a free end of said pair of arms, a counteracting spring acting between said rotary electromagnetic head and said free end of said pair of arms;

said cam being driven by said second sprocket wheel from a first position in opposition to said counteracting spring to a second position so as to move said bar away from said rotary electromagnetic head.

2. A rotary electromagnetic head with a mechanical expulsion device for automatic stackers of iron sections from a rolling mill, comprising:

a bar which rotates together with said rotary electromagnetic head;

a slot provided in said bar;

a pin extending from said rotary electromagnetic head;

said slot and said pin allowing said bar to move relative to said rotary electromagnetic head;

a cam which is movable between a first position acting against a counteracting spring, and a second position causing relative movement between said bar and said rotary electromagnetic head.

* * * * *